United States Patent Office 2,991,032
Patented July 4, 1961

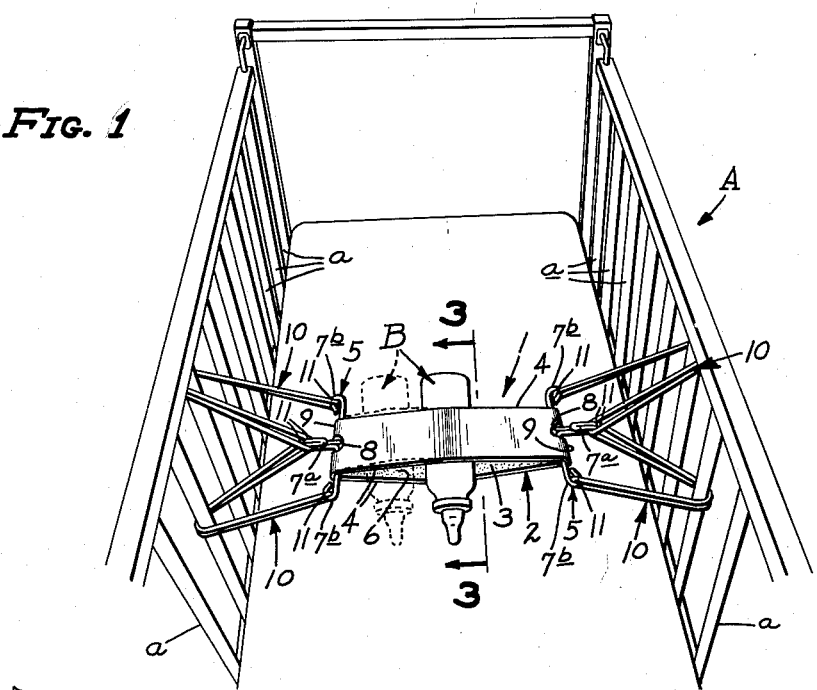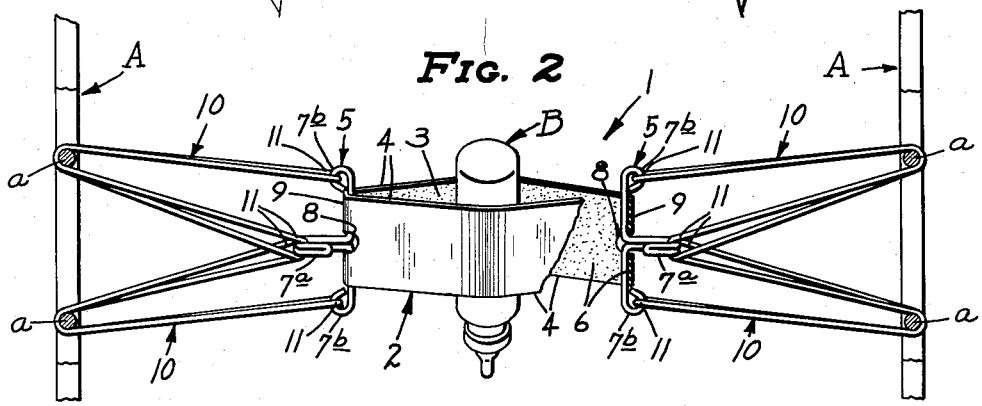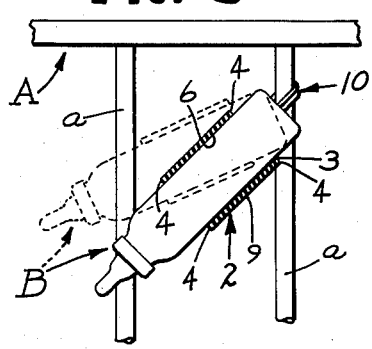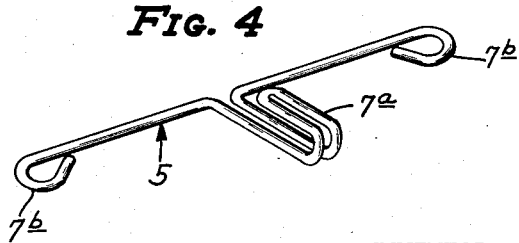
INVENTOR.
ERWIN C. THEIS

2,991,032
BABY BOTTLE HOLDER
Erwin C. Theis, Box 344, Delano, Minn.
Filed July 12, 1960, Ser. No. 42,342
3 Claims. (Cl. 248—102)

This invention relates generally to supporting appliances for nursing bottles, and more particularly it relates to a baby bottle holder adapted to carry and adjustably but firmly support a baby bottle in close proximity to an infant.

An important object of this invention is the provision of a baby bottle holder which includes an endless generally tubular flexible band which defines a bottle receiving axial opening which band, in addition to being adapted to permit easy insertion and release of a baby bottle therewithin, is also adapted to firmly engage and support a baby bottle by the mere elongation of the tubular band.

Another object of this invention is the provision of a baby bottle holder which includes novel fastening means for securing the baby bottle holder to an infant supporting device, such as a crib, bassinet or baby carriage, whereby a maximum of stability and security against oscillation is maintained.

A still further object of my invention is the provision of a device of the class above described in which limited movements of the bottle within the bottle holder may be readily achieved.

Another object, which is at least partially dependent upon the above stated objects of this invention, is the provision of a baby bottle holder which is adapted to firmly maintain a position of support for a baby bottle adjacent the mouth of an infant whereby the infant may easily and readily grasp or release the baby bottle at will.

A further object of this invention is the provision of a baby bottle holder which is easily adjustable to different positions with respect to the infant for whose use it is intended and also with respect to the supporting device upon which the baby is resting.

A still further object of this invention is the provision of a baby bottle holder which is manufactured from materials which enable the invention to be readily washed and sterilized.

Further objects of this invention reside in the provision of a baby bottle holder which is easily manipulated for its intended purpose, simple in construction, economical to manufacture and highly efficient in the vindication of its purposes.

The above and still further objects of this invention will become apparent from the following detailed specification, appended claims and attached drawings.

Referring to the drawings, wherein like reference characters indicate like parts or elements throughout the several views:

FIG. 1 is a view in perspective of the invention in its operative position, some parts being broken away;

FIG. 2 is a view in top plan, some parts being broken away and some parts shown in section;

FIG. 3 is a sectional view taken on the line 3—3 of FIG. 1, some parts being broken away; and FIG. 4 is a view in perspective of one of the stretcher bars.

Referring with greater particularity to the drawings, the reference letter A represents in general a baby supporting device, such as a baby crib, carriage, bassinet or the like, and the reference letter B represents a conventional nursing bottle. The reference numeral 1 represents in general a baby bottle holder, which comprises the invention to be disclosed herein. The baby bottle holder 1 comprises an endless generally tubular flexible band, represented in general by the reference numeral 2, which is adapted to receive within its axial opening 3 a baby bottle B. The tubular band 2 is preferably formed from a rubber or rubber-like material since the same has the required frictional qualities necessary for frictional engagement of the baby bottle B, as will hereinafter be particularly described. The tubular band 2 also defines opposed axially spaced end edges 4.

An important part of this invention is the provision of a pair of rigid stretcher bars, each being represented in general by the reference numeral 5, which are carried by the tubular band 2 and are disposed at least partially in a generally axially extending direction at generally perimetrically opposite points of the inner wall surface 6 of the tubular band 2. The stretcher bars 5 are both disposed with their opposite ends spaced adjacent the opposite end edges 4 of the tubular band 2, and each of the stretcher bars 5 is also formed at its intermediate portion and at the opposite ends thereof with anchoring loops, which are represented by the reference characters 7a—7b, respectively. It is noted that each of the intermediate anchoring loops 7a is open and is therefore in the nature of a hook, and the other anchoring loops 7b are closed and are therefore in the nature of eye elements.

In accordance with my invention, the tubular band 2 defines a pair of opposed laterally opening apertures 8 each spaced generally intermediate the end edges 4 thereof and also adjacent a different one of the stretcher bars 5. Each of the apertures 8 is provided for the purpose of receiving a different one of the intermediate open anchoring loops 7a defined by the stretcher bars 5, the respective open anchoring loops 7a extending through the apertures 8 and projecting laterally outwardly beyond the outer wall surface 9 of the tubular band 2.

For the purpose of providing means for fastening the baby bottle holder 1 to the baby supporting device A, a plurality of flexible elastic fastening bands, each represented in general by the reference numeral 10, are provided, the fastening bands 10 preferably being formed from a rubber or rubber-like material having the property of elasticity. By reference to FIGS. 1 and 2, it will be noted that the fastening bands 10 are adapted to be flattened so as to form loop-like bights 11 at generally opposite perimetric portions thereof. It should be noted that one bight 11 of each band 10 of a pair of fastening bands 10 is received within the closed anchoring loops 7b defined by each of the stretcher bars 5.

The above description completely describes the structure of my invention, and the following is offered for the purpose of explaining the operative simplicity and function of this invention. The fastening bands 10 are further adapted to be extended and at their generally intermediate double portions to engage spaced points of support, such as the side rails or other structural elements $a$ of the baby supporting device A. Then, in order to securely fasten the baby bottle holder 1 to the supporting device A, the free bights 11 of each of the fastening bands 10 are returned to and engage the open anchoring loops 7a defined by the respective stretcher bars 5 which secure the fastening bands 10. It should be emphasized that the tension resulting from the distention of the fastening bands 10 imparts tension to the tubular bands 2 so as to tend to flatten the tubular band 2 and increase the frictional engagement thereof with respect to a baby bottle B received therein. The mere elongation and tension of the tubular band 2 adequately supports the baby bottle B in the desired position adjacent an infant, the support given to the baby bottle B by the tubular band 2 being entirely adequate to prevent undesired disengagement or removal of a baby bottle B by the infant for whose use it is intended. However, in order to further discourage undesirable disengagement or removal of a bottle B, the inner surface 6 of the band 2 may be of a roughened or rugose texture. However, this frictional engagement is not such as to prevent intentional adjustment of the bottle B within the band 2 toward and from opposite stretcher bars 5 as a given situation may require, and as is illustrated by the dotted lines of FIGS. 1 and 3.

A further operational function of this invention resides in the fact that the tension in the fastening bands 10 cooperates with the stretcher bars 5 so as to stabilize the holder 1 and the bottle B carried thereby against any accidental oscillatory movement, such as might be occasioned by engagement of the bottle holder 1 by the infant for whose use it is intended. It should be particularly understood that it is the stretcher bars 5 in cooperation with the fastening bands 10 which impart the self-stabilizing feature to this invention. The particular construction of the fastening bands 10, along with the design of the stretcher bars 5, adapts my invention so that it may be adjustably secured to many different types of supporting devices A, and further adapts my invention so that the same may be easily adjusted to any desired position with respect to both the supporting device A and the infant for whose use it is intended. More specifically to this, such adjustment is obviously accomplished by slidably raising and/or lowering a given one of the elastic fastening bands 10 with respect to the side rails $a$ of the supporting device A, whereby to achieve any desired angular positioning of the bottle B about an axis transversely of the supporting device A.

This invention has been thoroughly tested and found to be completely satisfactory for the accomplishment of the above objects; and while I have shown a preferred embodiment thereof, I wish it to be specifically understood that the same may be modified without departure from the scope and spirit of the appended claims.

What I claim is:

1. A baby bottle holder comprising an endless generally tubular flexible band which is adapted to receive within its axial opening a baby bottle, said tubular band defining opposed axially spaced end edges, a pair of rigid stretcher bars carried by said tubular band and disposed at least partially in a generally axially extending direction at generally perimetrically opposite points of said tubular band, said stretcher bars each having its opposite ends spaced adjacent the opposite end edges of said tubular band, each of said stretcher bars being formed at its opposite ends and at an intermediate portion thereof with anchoring loops, and a plurality of flexible elastic fastening bands at least one of which is secured to each of said stretcher bars by said anchoring loops, said fastening bands being adapted to be distended and at their generally intermediate portions to engage spaced points of support, the free ends of said fastening bands being returned to and engaging the anchoring loops defined by the respective stretcher bars securing said fastening bands, whereby the tension resulting from the distention of said fastening bands imparts tension to said tubular band so as to tend to flatten said tubular band and increase the frictional engagement thereof with respect to a baby bottle received therein, the tension in said fastening bands also cooperating with said stretcher bars whereby to stabilize said holder and the bottle carried thereby against oscillatory movement.

2. A baby bottle holder comprising an endless generally tubular flexible band which is adapted to receive within its axial opening a baby bottle, said tubular band defining opposed axially spaced end edges, a pair of rigid stretcher bars carried by said tubular band and disposed at least partially in a generally axially extending direction at generally perimetrically opposite points of the inner wall surface of said tubular band, said stretcher bars each having its opposite ends spaced adjacent the opposite end edges of said tubular band, each of said stretcher bars being formed at its opposite ends and at an intermediate portion thereof with anchoring loops, said tubular band defining a pair of laterally opening apertures each spaced generally intermediate the end edges thereof and adjacent a different one of said stretcher bars, each of the intermediate anchoring loops defined by each of said stretcher bars extending through a different one of said apertures and projecting laterally outwardly beyond the outer wall surface of said tubular band, and a plurality of endless flexible elastic rubber-like fastening bands one pair of which is secured to each of said bar elements by said anchoring loops, said fastening bands being adapted to be distended and at their generally intermediate portions to engage spaced points of support, the free ends of said fastening bands being returned to and engaging the anchoring loops defined by the respective stretcher bars securing said fastening bands, whereby the tension resulting from the distention of said fastening bands imparts tension to said tubular band so as to tend to flatten said tubular band and increase the frictional engagement thereof with respect to a baby bottle received therein, the tension in said fastening bands also cooperating with said stretcher bars whereby to stabilize said holder and the bottle carried thereby against oscillatory movement.

3. A baby bottle holder comprising an endless generally tubular flexible rubber-like band which is adapted to receive within its axial opening a baby bottle, said tubular band defining opposed axially spaced end edges, a pair of rigid stretcher bars carried by said tubular band and disposed at least partially in a generally axially extending direction at generally perimetrically opposite points of the inner wall surface of said tubular band, said stretcher bars each having its opposite ends spaced adjacent the opposite end edges of said tubular band, each of said stretcher bars being formed at its opposite ends and at an intermediate portion thereof with anchoring loops, at least one of the anchoring loops defined by each of said stretcher bars being open and the other thereof being closed, said tubular band defining a pair of laterally opening apertures each spaced generally intermediate the end edges thereof and adjacent a different one of said stretcher bars, each of the intermediate anchoring loops defined by each of said stretcher bars extending through a different one of said apertures and projecting laterally outwardly beyond the outer wall surface of said tubular band, and a plurality of flexible elastic rubber-like fastening bands, said fastening bands being adapted to be flattened so as to form loop-like bights at generally opposite perimetric portions thereof, one bight of each band of a pair of fastening bands being received within the closed anchoring loops defined by each of said stretcher bars, said fastening bands being further adapted to be distended and at their generally intermediate double portions to engage spaced points of support, the free bights of each of said fastening bands being returned to and engaging the open anchoring loops defined by the respective stretcher bars securing said fastening bands, whereby the tension resulting from the distention of said fastening bands imparts tension to said tubular band so as to tend to flatten said tubular band and increase the frictional engagement thereof with respect to a baby bottle received therein, the tension in said fastening bands also cooperating with said stretcher bars whereby to stabilize said holder and the bottle carried thereby against oscillatory movement.

References Cited in the file of this patent

UNITED STATES PATENTS

| | | |
|---|---|---|
| 2,199,869 | Baker | May 7, 1940 |
| 2,399,320 | Brose | Apr. 30, 1946 |
| 2,490,207 | Cassile | Dec. 6, 1949 |